Patented Dec. 25, 1923.

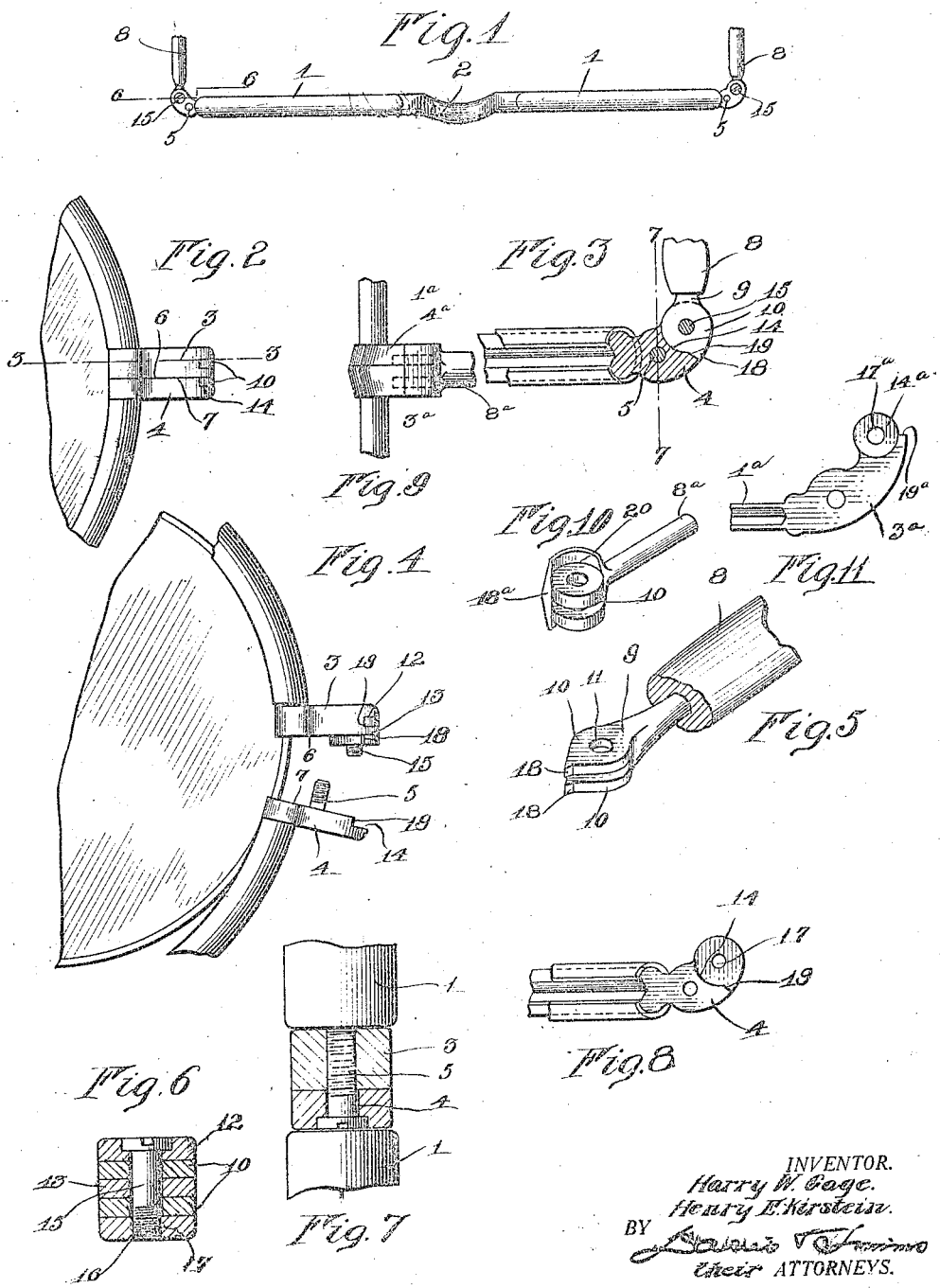

1,478,661

UNITED STATES PATENT OFFICE.

HENRY E. KIRSTEIN AND HARRY W. GAGE, OF ROCHESTER, NEW YORK, ASSIGNORS TO SHUR-ON OPTICAL CO., INC., OF ROCHESTER, NEW YORK, A CORPORATION OF NEW YORK.

OPHTHALMIC MOUNTING.

Application filed February 16, 1923. Serial No. 619,495.

*To all whom it may concern:*

Be it known that we, HENRY E. KIRSTEIN and HARRY W. GAGE, citizens of the United States, and residents of Rochester, in the county of Monroe and State of New York, have invented certain new and useful Improvements in Ophthalmic Mountings, of which the following is a specification.

The present invention relates to ophthalmic mountings and more particularly to the type which are known as spectacles and have temples pivotally connected to the opposite sides of the lens rims. An object of this invention is to so construct the temple ends that the tendency of the temple ends adjacent the pivots to break off is reduced to a minimum. Another object of the invention is to provide increased bearing surface between each temple and the frame so that the tendency of the temple to work loose in the frame will be overcome. Still another object of the invention is to provide improved connection between the temple and a split rim, so that either the split rim may be opened or closed without removing the temple, or the temple may be removed or fitted to the rim without opening the rim.

To these and other ends, the invention consists of certain parts and combinations of parts, all of which will be hereinafter described; the novel features being pointed out in the appended claims.

In the drawings:

Fig. 1 is a plan view of an ophthalmic mounting constructed in accordance with this invention, the temples being broken away;

Fig. 2 is a front view of the mounting adjacent one of the temples;

Fig. 3 is a section on the line 3—3, Fig. 2;

Fig. 4 is a fragmentary view showing the split rim opened;

Fig. 5 is a perspective view of a temple end;

Fig. 6 is an enlarged section on the line 6—6, Fig. 1;

Fig. 7 is an enlarged section on the line 7—7, Fig. 3;

Fig. 8 is a detail view showing one of the end pieces;

Fig. 9 is a fragmentary side view in the embodiment of the invention;

Fig. 10 is a perspective view of the temple employed in such embodiment; and

Fig. 11 is a plan view of one of the end pieces.

At the present time it is customary to connect the temples to the lens rims each by a pivot ear on a thin wire either forming the body of a temple or embedded in non-metallic material forming the body of the temple. This ear in order that the ear may be held properly so that looseness of the ear on the frame is prevented is made thinner than the wire to which it is secured. As a result, the connection between the ear and the wire is weakened and the temple breaks at this point. It is, furthermore, customary to provide a temple with a single pivot ear secured between the two end pieces of a split lens rim of an ophthalmic frame by a single or double screw which connects the two end pieces. With such a construction, the removal of the single screw to remove the lens or to remove a temple also effects the removal of the other of said two parts. It has also been suggested prior to the present invention to fasten the temple and the end pieces by two separate screws, but, in such prior suggestion, one of the end pieces has been made shorter than the other, and a separate piece has been employed for producing a binding action on the temple. Such a construction has had the disadvantage that it has been impossible, in view of the shortness of one of the end pieces properly to effect a tight connection between these parts, and, furthermore, the separate clamping piece was such as to be difficult to handle and to become readily lost. Furthermore, this prior device also had the disadvantage that a weak connection must be provided between a single ear on the temple and the main body of the temple.

According to this invention, each temple is constructed at its pivot end so that the bending and breaking thereof adjacent the pivot is overcome due to the fact that a plurality of ears is provided integrally connected with the temple wire by a portion which is at least as strong as the adjacent portions of the temple wire. Provision is also made whereby a split rim to which the temple is secured may be opened without removing the temple or the temple may be removed without opening the split rim and without the use of a clamping device separate from the two end pieces.

In the illustrated embodiment of the invention, the frame comprises rims 1 connected by a bridging portion 2, each ring being split and having two end pieces or terminals 3 and 4. A screw or fastener 5 mounted to turn in the end piece 4 and having threaded engagement with the end piece 3 serves to hold the abutting portions 6 and 7 on the respective end pieces 3 and 4, in engagement.

The temple 8, preferably made of non-metallic material, has a metal insert 9 formed with a plurality of pivot ears 10, in this instance two. The distance between the lower face of the lower ear and the upper face of the upper ear is at least equal to and preferably thicker than the thickness of the metal insert or wire 9 so that this wire is not weakened in immediate proximity to the temple ears. These ears are spaced apart and have aligned openings 11. In order that the temple may connect with the terminal or end piece 3, the latter has a slot 12 in which one of the ears 10 is received, a portion 13 on the end piece lying between the two ears and one of the ears cooperates with the inner face of the end piece 3. The end piece 4 is notched or recessed at 14, so as to receive the other ear 10 when the two end pieces 3 and 4 are held together by the screw or fastener 5. A pivot fastener 15 extends loosely through the end piece 3, as well as loosely through both of the ears 10, the end of this pivot pin being screw threaded at 16, so as to engage the screw threaded openings 17 in the end piece 4. Movement of the temple on the pivot may be limited in outward direction by two stops 18 formed on the ears 10 and adapted to cooperate with shoulders 19 formed on the end pieces 3 and 4.

It will be seen that with this arrangement, in order to remove the lens or fit one in a split rim, the screw fastener 5 should be removed and the screw fastener 15 turned to loosen its connection with the end piece 4. The rim 1 may then be opened and closed without removing the temple from its connection with the end piece 3. When the two end pieces 3 and 4 are secured together they are held by two screws and this makes it possible to securely fasten these parts in order to prevent a gap between them. The two end pieces or terminals are substantially the same length, so that there is no tendency for one to rock on the other as when one is shorter than the other and fastened by a single screw arranged in close proximity to the lens rim. Furthermore, the temple is held to one of the end pieces when the end pieces are separated and may be disconnected from the end pieces while the end pieces are held together by the screw 5. The plurality of ears on the temple makes it possible to provide a strong connection between the ears and the main portion of the temple, thus preventing the usual bending as when one ear alone is provided. The increased number of ears also gives greater bearing surface between the temple and the mounting so that the tendency of the temple to become loose is overcome.

In Figs. 9, 10 and 11, the invention is shown as embodied in an English style of ophthalmic mounting. In this embodiment, 8ª indicates the usual metallic temple, 1ª indicates the rim which has two end pieces 3ª and 4ª. The end piece 3ª is slotted while the end piece 4ª is notched or recessed at 14ª. A threaded opening 17ª is provided in this recessed portion for a screw fastener such as illustrated in Fig. 4 at 15. The temple 8ª in the form of a wire has two ears 10 arranged in parallel relation. The distance between the lower surface of the lower ear and the upper surface of the upper ear is also greater in this embodiment than the thickness of the wire 8ª, so that a weakened portion adjacent the ears is not provided. The main differences between this embodiment and the first described embodiment is the manner of stopping the outer movement of the temple. This is effected by providing both of the terminals or end pieces 3ª and 4ª with shoulders 19ª which extend the full thickness of said end pieces. These two shoulders are engaged by a swinging shoulder 18ª on the temple formed preferably by providing a segmental sleeve portion 20 which connects the two ears 10 and provides in addition to the said shoulder, two flanges extending upwardly and downwardly from the ears in concentric relation to the pivot of the temple.

What we claim as our invention and desire to secure by Letters Patent is:

1. An ophthalmic mounting comprising a temple having two spaced ears, and a split lens rim having two end pieces detachably connected together, one of said end pieces having the two ears of the temple mounted thereon and also having a portion extending between the ears.

2. In an ophthalmic mounting, a split rim having two end pieces, one of which is provided with a slot, and a temple having two ears, one of which lies between the two end pieces and the other of which operates in the slot.

3. In an ophthalmic mounting, a split rim having two end pieces at opposite sides of the split, one of which is provided with a slot, a screw fastener connecting said end pieces, a temple having two ears, one of which lies in the slot, and the other of which lies between the two end pieces, and a pivot screw extending through the slotted end piece and both ears of the temple and having threaded engagement with the other end piece.

4. An ophthalmic mounting comprising a split rim having two end pieces, one of which is provided with a slot, two screws connecting said end pieces, and a temple having two ears mounted on one of said screws, one of said ears lying in a slot of the slotted end piece and the other of said ears lying between the two end pieces.

5. An ophthalmic mounting comprising a split rim having two end pieces, one of which is provided with a slot and the other of which has its face opposed to the slotted end piece formed with a recess, one wall of which has a shoulder, two screws connecting said end pieces, and a temple having two ears, one of said ears lying in the slot of the slotted end piece and the other of said ears lying between the two end pieces, each of said ears having a shoulder thereon, one to cooperate with the wall of the slot in the first mentioned piece and the other to cooperate with the shoulder forming the wall of the recess in the other end piece.

6. In an ophthalmic mounting, the combination with a temple having a wire and two spaced ears integral with said wire, the distance between the lower face of the lower ear and the upper face of the upper ear being at least as great as the thickness of the wire, combined with a frame having a portion lying between the two ears, a portion lying above the uppermost ear and a portion lying below the lowermost ear, and a pivot pin extended through the said portions of the frame and the two ears of the temple to connect the temple to the frame.

HENRY E. KIRSTEIN.
HARRY W. GAGE.